US011221429B2

(12) United States Patent
Pugh et al.

(10) Patent No.: US 11,221,429 B2
(45) Date of Patent: Jan. 11, 2022

(54) COHERENT TRANSMIT AND RECEIVER BI-STATIC ELECTROMAGNETIC GEOPHYSICAL TOMOGRAPHY

(71) Applicant: Deep Imaging Technologies, Inc., Tomball, TX (US)

(72) Inventors: Trevor Keith Charles Pugh, Tomball, TX (US); Robert Michael Payton, The Woodlands, TX (US); Timothy Morgan, Spring, TX (US)

(73) Assignee: Deep Imaging Technologies, Inc., Tomball, TX (US)

( * ) Notice: Subject to any disclaimer, the term of this patent is extended or adjusted under 35 U.S.C. 154(b) by 902 days.

(21) Appl. No.: 14/491,113

(22) Filed: Sep. 19, 2014

(65) Prior Publication Data

US 2015/0081219 A1    Mar. 19, 2015

Related U.S. Application Data

(60) Provisional application No. 61/879,990, filed on Sep. 19, 2013.

(51) Int. Cl.
*G01V 3/12* (2006.01)
*G01V 3/08* (2006.01)

(52) U.S. Cl.
CPC .............. *G01V 3/12* (2013.01); *G01V 3/083* (2013.01)

(58) Field of Classification Search
CPC ....... G01R 19/2506; G01V 3/12; G01V 3/083
USPC .......................................................... 702/2
See application file for complete search history.

(56) References Cited

U.S. PATENT DOCUMENTS

| 6,097,751 | A | * | 8/2000 | Relph ................ H04J 13/0022 370/312 |
| 6,192,316 | B1 | * | 2/2001 | Hornby .................... G01V 1/50 367/38 |
| 7,795,873 | B2 | | 9/2010 | Ziolkowski et al. |
| 7,872,944 | B2 | | 1/2011 | Eisner et al. |
| 2009/0157320 | A1 | * | 6/2009 | Abubakar .............. G01V 11/00 702/11 |
| 2010/0110831 | A1 | * | 5/2010 | Love ..................... G01V 1/005 367/32 |
| 2010/0201367 | A1 | | 8/2010 | Ziolkowski |
| 2011/0267921 | A1 | * | 11/2011 | Mortel .................... G01V 1/28 367/25 |
| 2012/0010818 | A1 | | 1/2012 | Kalish |
| 2012/0113750 | A1 | * | 5/2012 | Al-Momin ............. G01V 1/364 367/38 |

(Continued)

FOREIGN PATENT DOCUMENTS

| WO | 2008081469 A2 | 7/2008 |
| WO | 2013173782 A1 | 11/2013 |

OTHER PUBLICATIONS

P. M. Duncan et al. "The development and applications of a wide band electromagnetic sounding system using a pseudo-noise source" Geophysics, vol. 45, No. 8, pp. 1276-1296 (Aug. 1980).

(Continued)

*Primary Examiner* — Michael P Nghiem
(74) *Attorney, Agent, or Firm* — Schafer IP Law

(57) ABSTRACT

Devices and processes provide for geophysical oil, gas, or mineral prospecting and subsurface fluid monitoring, using a controlled source electromagnetic system that transmits a designed probe wave to create images of sub-surface structures and fluids either statically or while in motion.

7 Claims, 5 Drawing Sheets

(56) References Cited

U.S. PATENT DOCUMENTS

| | | | |
|---|---|---|---|
| 2012/0179372 A1 | 7/2012 | Kalish | |
| 2014/0078864 A1* | 3/2014 | Freitas | G01V 1/42 367/57 |
| 2014/0239956 A1* | 8/2014 | Hoversten | G01V 3/12 324/334 |
| 2015/0192688 A1* | 7/2015 | Pugh | E21B 43/26 166/308.1 |

OTHER PUBLICATIONS

Anton Ziolkowski et al., Comparison of pseudo-random binary sequence and square-wave transient controlled-source electromagnetic data over the Peon gas discovery, Geophysical Prospecting, vol. 59, No. 6, pp. 1114-1131, (Nov. 2011).

Sofia Davydycheva et al. "Focused-source electromagnetic survey versus standard CSEM: 3D modeling in complex geometries." Geophysics, vol. 76, No. 1, pp. F27-F41. (Jan. 2011).

U.S. Appl. No. 61/648,305, filed May 17, 2012.

U.S. Appl. No. 61/684,347, filed Aug. 17, 2012.

U.S. Appl. No. 61/879,990, filed Sep. 19, 2013.

\* cited by examiner

COHERENT TRANSMIT AND RECEIVER BI-STATIC ELECTROMAGNETIC GEOPHYSICAL TOMOGRAPHY

TECHNICAL FIELD

The invention relates to devices and processes for geophysical prospecting, subsurface fluid monitoring and, more particularly, to the use of techniques using Control Source Electromagnetic ("CSEM") signals to create images of sub-surface structures that vary in resistivity either spatially or over a period of time and creating a surface based resistivity log in areas of unknown geology.

BACKGROUND ART

The current state of the art for monitoring hydraulic fracturing ("fracing" or "frac") involves using processes that depend on acoustic or stress-strain based listening devices, such as hydrophones, placed in an adjacent parallel well, or co-located around the well of interest on the surface. This method is commonly referred to as Micro Seismic Monitoring ("MSM") and is typified by U.S. Pat. No. 7,872,944 and is incorporated herein by reference.

The MSM technique has several basic flaws. (a) The method is a secondary indicator of the actual fluid location and extent within the sub-surface formation. (b) The method does not indicate if the propant has been successfully introduced into the sub-surface formation. (c) The method does not report any information relating to the quality of the fluid present in fractures in the formation, as might be defined by measurements of porosity and resistivity. (d) There are intricate procedures required to move and relocate the sensor arrays for each sub-surface depth at which the fracturing operation that occurs. (e) Noises created in the fracing process do not necessarily correlate with successful oil or gas flow porosity increases. Noises made while the fracing procedure is progressing can be stress or stain relief occurring in structures that do not contribute to the very purpose of fracing: increasing porosity or oil or gas flow to the well being created.

SUMMARY OF INVENTION

The disclosed subject matter relates to devices and processes for geophysical oil, gas, or mineral prospecting, subsurface fluid monitoring, and, more particularly, to the use of a coherent system capable of using a CSEM system to transmit a designed probe wave to create images of sub-surface structures and fluids either statically or while in motion.

Various embodiments transmit a coherent temporally structured electromagnetic ("EM") wave into the geophysical structure via one or more transmitters, then coherently receive and record the scattered EM wave via one or more EM receivers. The recorded EM scatter signals are processed into a one dimensional log or a three dimensional image of the geophysical structure via transfer function, cross correlation, or time domain beam forming, or a combination of all of these signal processing methods. These waves are transmitted continuously and are not the classic Induced Polarization technique of powering down the transmitter to "listen" for a response.

One aspect uses the transfer function data which is expressed as amplitude ratio and phase difference in the time domain to create multiple 2D horizontal planar images over discrete intervals of time that represent the subsurface movement of fluid and or gases in a horizontal plain during a fracing operation, flow back operation, Enhanced Oil Recovery ("EOR") operation, or any other operation that causes materials of different resistivity's to move in subsurface structures.

Another aspect uses the cross correlation data created from the temporally structured probe wave and a iterative process to correct for velocity and dispersion errors in the data to create multiple 3D images over discrete intervals of time that represent the 3D movement of fluid and or gases during a fracing operation, flow back operation, EOR operation, or any other operation that causes materials of different resistivity's to move in subsurface structures.

Yet another aspect allows detecting signals on the surface in real time, with no stacking, that are of the order of $1\times10^{-10}$ V/m and with a system wide timing accuracy of less than 20 nanoseconds. These signals are detected on the surface within the near field of the transmitters. The design criteria are borne out by modeling and data collected in field operations.

In yet another aspect of the invention the real time creation of images of subsurface fracing, flowbacks, and EOR operations allow the operator to change and control aspects of the subsurface operation to improve the outcome before completion of the operation.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
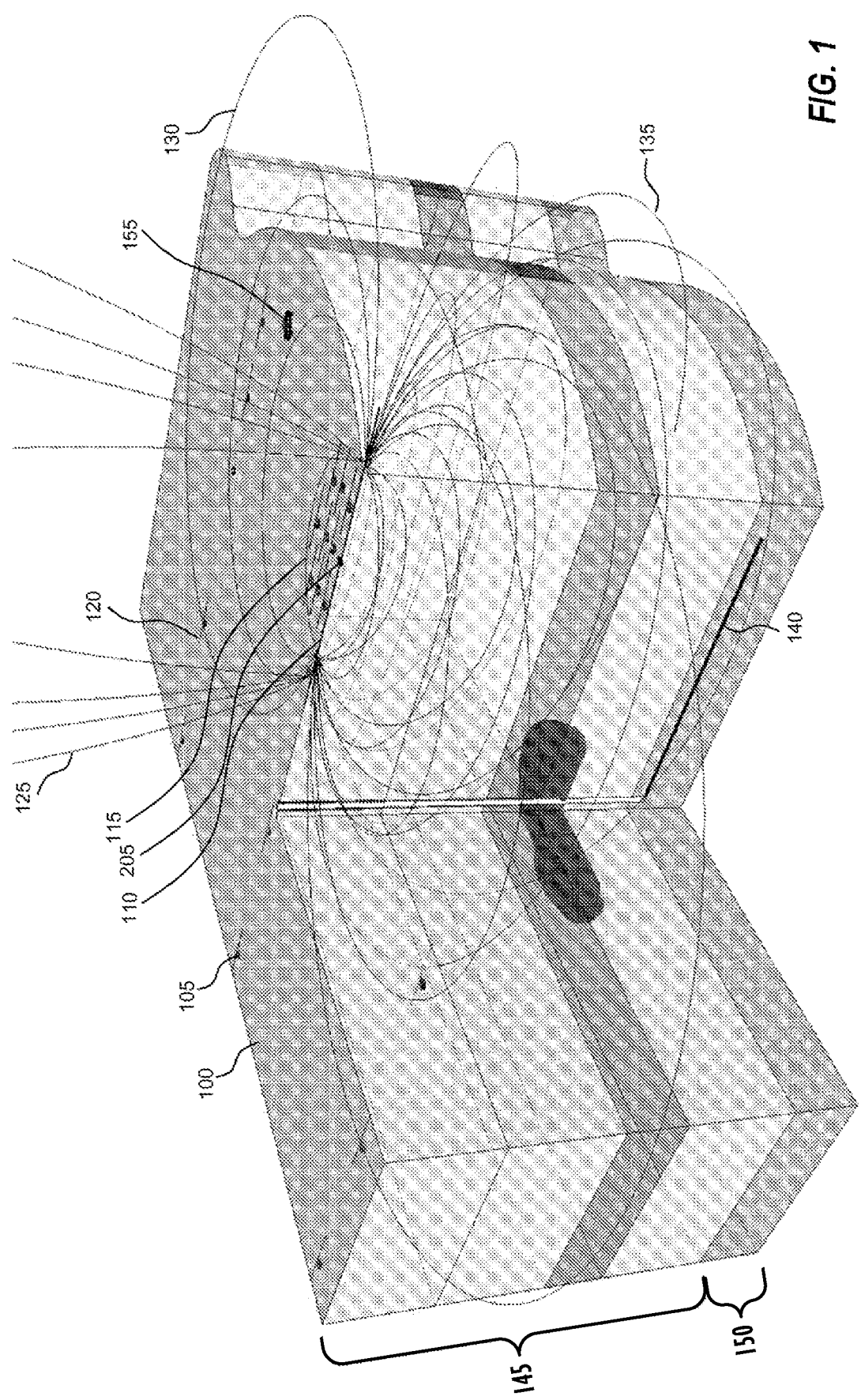
FIG. 1 depicts a typical source, object and receiver arrangement and the three types of EM waves defined within the disclosed subject matter.

The CSEM system disclosed herein can measure fluid movement in all stages of a typical well operation. The stages of a well operation are typically frac monitoring, flow back monitoring, EOR monitoring and long term monitoring. In each case the system provides a real time or near real time result that enables Oil and Gas ("O&G") operators to change the operation being performed in real time.

The description set forth below also relates to remote, distributed, geophysical measurements that support production of vertical one dimensional oil field "virtual logs" and three dimensional images of subsurface geophysical features such as changes in resistivity, conductivity, impedance, EM permeability and permittivity. The measurements produced by the system allow remote inference of the subsurface features without drilling to conduct measurements. The measurements are made without wireline tools or measurement while drilling tools. The virtual logs and three dimensional images are made possible by an understanding of the way in which a temporally structured EM probe wave can reflect from resistivity interfaces and return very weak signals to the surface that indicate subsurface structure and resistivity changes as a result In CSEM geophysical surveying there are two basic remote electrical measurements: Induced Polarization ("IP") and EM. IP charges up the geophysical structure with high voltages or currents, and observes the charge decay to infer underlying structure. EM transmits some form of electromagnetic wave into the geophysical structure and observes returning EM waves to infer underlying geophysical structure.

In the Geophysical EM measurement community there is a widely held opinion that there are no "reflections" in deep EM geophysical measurements. The assertion is that only "diffuse scatter" and "refraction" occur. As described herein, there are indeed reflections from geophysical layers when the layer structure has changes in resistivity (or conductance), or EM permeability or permittivity. The strongest effect is resistivity changes.

In addition the Geophysical EM measurement community widely holds that the only way to receive the very small signals that are expected from non-reflective structures is to disable the transmitter and "listen" for the low frequency response. The various embodiments described herein have no such requirement and operate using continuous wave transmission.

Every edge or change in EM transmission for geophysical measurement produces an EM airwave that radiates out into the air and space, an earth wave, also known as a ground wave, that radiates along the air-geophysical boundary, and the geophysical wave that penetrates into the ground or other geophysical medium and returns to the surface after scatter. Frequently, particularly in the near field, the received EM wave dynamic range at the surface is strongly dominated by the airwave and the ground wave. Embodiments described herein provide a way of providing dynamic range that allows reception of the very small geophysical wave scatter, at depth, in the presence of a strong interference from much larger air and ground waves.

Embodiments measure changes in resistivity, conductivity, impedance, EM permeability and permittivity by illuminating the geophysical structure with a temporally structured EM wave, receiving and recording the reflected EM waves, and inferring, remotely, the underlying geophysical structure by coherent time-of-flight methods.

A significant problem relating to the techniques of tomography and Extremely Low Frequency ("ELF") radar imaging in subsurface formations that are presented in the description below is the extreme effects of dispersion and attenuation of the transmitted wave. A method is described herein for correcting for dispersion and attenuation effects on the transmitted and the reflected wave scattered or refraction.

There is clear link between reflectivity and resistivity and, as described herein, subsurface resistivity can be resolved through a process that includes a cross correlation product of a Pseudo-Random Noise (PRN) code designed waveform and a successive step procedure that resolves each layer of resistivity with very high positional accuracy near the surface and reduced positional accuracy with depth. The procedure will be referred to as the Onion Peeler: return signals are peeled off and removed in order to remove the effects of previous reflections in order to see later heavily dispersed and attenuated reflections deeper in to the geophysical layers.

The description below also shows that a PRN code can be designed in such a way that any cyclic noise such as 60 Hz or 50 Hz will not be coherent with the PRN code. This is done by designing a code that does not terminate in a time period that is coincident with that of either 60 Hz or 50 Hz timing.

Consider resistivity based geophysical EM reflections and given geophysical media with the variables specified in Table 1.

TABLE 1

| Nomenclature | Parameter | Units |
|---|---|---|
| ρ | resistivity | [Ohm-meters] |
| ε | EM permittivity | [Farads/meter] |
| μ | EM permeability | [Henries/meter] |
| ω | Radian frequency | [Radians/second] |
| E | Electric Field | [Volts/meter] |
| H | Magnetic Field | [Amperes/meter] |
| η | Wave Characteristic Impedance | [Ohms] |
| C | Wave Phase Velocity | [meters/second] |

The EM wave equation for a resistive medium, as derived from Maxwell's Equations is as follows in Eqns. 1 and 2:

$$\nabla^2 \vec{H} = j\omega\mu\left(\frac{1}{\rho} + j\omega\varepsilon\right)\vec{H} = \gamma^2 \vec{H} \quad (1)$$

$$\nabla^2 \vec{E} = j\omega\mu\left(\frac{1}{\rho} + j\omega\varepsilon\right)\vec{E} = \gamma^2 \vec{E} \quad (2)$$

In an orthogonal (x,y,z) coordinated system, a wave propagating in the z direction in a resistive media polarized in the x direction experiences a characteristic impedance, η, shown in Eqn. 3:

$$\eta = \frac{E_x}{H_y} = \sqrt{\frac{j\omega\mu}{\frac{1}{\rho} + j\omega\varepsilon}} \quad (3)$$

For most geophysical conditions at low frequency, the characteristic impedance is dominated by resistivity, and can be accurately approximated Eqn. 4:

$$\eta(\omega) = \frac{E_x}{H_y} = \sqrt{\frac{j\omega\mu}{\frac{1}{\rho} + j\omega\varepsilon}} \cong \sqrt{\frac{\omega\mu\rho}{2}}\sqrt{1+j} = \sqrt{\omega\mu\rho}\angle 45° \quad (4)$$

When the characteristic impedance changes along a propagation path z, the reflection density, r(z,ω), due to change of characteristic impedance is shown in Eqn. 5:

$$r(z,\omega) = \lim_{\Delta z \to 0} \frac{\eta(z+\Delta z, \omega) - \eta(z, \omega)}{\eta(z+\Delta z, \omega) + \eta(z, \omega)} = \frac{1}{2\eta(z,\omega)} \frac{\partial \eta(z,\omega)}{\partial z} \quad (5)$$

Applying this operator to the characteristic impedance for a wave in a resistive media as shown in Eqns. 6-8:

$$r(z,\omega) = \frac{1}{2\eta(z,\omega)} \frac{\partial \eta(z,\omega)}{\partial z} \quad (6)$$

-continued $$r(z, \omega) \cong \sqrt{\frac{1+j}{2}} \left( \sqrt{\omega \mu(z)} \frac{1}{\rho(z)} \frac{\partial \rho(z)}{\partial z} + \sqrt{\omega \rho(z)} \frac{1}{\mu(z)} \frac{\partial \mu(z)}{\partial z} \right) \quad (7)$$

$$r(z, \omega) \cong \sqrt{\frac{1+j}{2}} \sqrt{\omega \mu} \frac{1}{\rho(z)} \frac{\partial \rho(z)}{\partial z} \cong k \frac{1}{\rho(z)} \frac{\partial \rho(z)}{\partial z} \quad (8)$$

The natural log of the resistivity is approximated by an integration shown in Eqn. 9:

$$k \ln(\rho(z)) - k \ln(\rho(0)) \cong \int_0^L r(z) \, dz \cong \int_0^L k \frac{1}{\rho(z)} \frac{\partial \rho(z)}{\partial z} \, dz \quad (9)$$

$$k = \sqrt{\frac{1+j}{2}} \sqrt{\omega \mu}$$

Or:

$$\rho(z) \cong \rho(0) e^{\frac{1}{k} \int_0^L r(z) dz} \cong \rho(0) e^{\int_0^L \frac{1}{\rho(z)} \frac{\partial \rho(z)}{\partial z} dx} \quad (10)$$

Eqns. 9 and 10 describe equivalence between subsurface resistivity and subsurface reflections of an EM wave. The math presented glosses over many important details like the refraction, attenuation, dispersion and frequency dependence of the scatter from reflections. At a fundamental level resistivity changes cause reflections.

Considering one dimensional mono-static scatter principles. An EM transmitter emits a probe wave e(t), that is a plane wave, then the backscatter, b(t), off of a one dimensional media with small reflectivity of r(z) and wave velocity C, is to first approximation shown in Eqn. 11:

$$b(t) \cong \int_0^\infty e\left(t - \frac{2z}{c}\right) r(z) \, dz \quad (11)$$

Taking the Fourier Transform of both sides as shown in Eqn. 12:

$$\int_{-\infty}^\infty b(t) e^{-j\omega t} \, dt \cong \int_{-\infty}^\infty e^{-j\omega t} \int_0^\infty e\left(t - \frac{2z}{c}\right) r(z) \, dz \, dt \quad (12)$$

And Eqn. 13:

$$\int_{-\infty}^\infty b(t) e^{-j\omega t} \, dt = B(\omega) \cong \int_0^\infty E(\omega) e^{-j\frac{\omega 2z}{C}} r(z) \, dz \quad (13)$$

$$= E(\omega) \int_0^\infty r(z) e^{-j\frac{\omega 2z}{C}} \, dz$$

$$= E(\omega) R\left(\frac{2\omega}{C}\right)$$

The approximate transfer-function from the transmitter through the geophysical media and back to the receiver is shown in Eqn. 14:

$$\frac{B(\omega)}{E(\omega)} \cong \int_0^\infty r(z) e^{-j\frac{\omega 2z}{C}} \, dz = R\left(\frac{2\omega}{C}\right) \quad (14)$$

Eqn. 14 is the Fourier transform of the reflection density in $$\frac{2\omega}{C}$$

space (twice the wavenumber space).

Now consider three dimensional bi-static scatter principles. A bi-static measurement is created by the transmitter and the receiver being positioned at two separate locations. The transmitted waveform ("probe wave"), e(t), propagates from the transmitter through the geophysical medium, reflects off a resistivity change r(z), changes direction and additionally reflects off subsequent subsurface resistance changes, then propagates to the receiver via a different path and becomes the received signal, b(t). In addition, some portion of the incident waveform e(t) continues past the resistance change r(z). Typically the largest reflection occurs at locations where there is a large change in resistance from layer to layer. The assumption of a point source, spherically propagating, is assumed in this simple analysis. If the transmitter is located at XYZ coordinates $[X_T, Y_T, 0]$, the receiver is located at coordinates $[X_R(n), Y_R(n), 0]$ and the reflecting resistance is at depth at coordinates [x,y,z] (z is depth), the bi-static reception of nth receiver b(n,t) is shown in eqn. 15:

$$b(n, t) \cong \quad (15)$$

$$\int_0^\infty \int_0^\infty \int_0^\infty e\left(t - \frac{\sqrt{(x - X_T)^2 + (y - Y_T)^2 + z^2}}{C} - \frac{\sqrt{(x - X_R(n))^2 + (y - Y_R(n))^2 + z^2}}{C}\right) r(x, y, z) \, dz \, dy \, dz$$

In Eqn. (16), $L_T$ is the distance from transmitter to reflection point, and in Eqn. (17) $L_R$ is the distance from the reflection point to the receiver.

$$L_T(x, y, z) = \sqrt{(x - X_T)^2 + (y - Y_T)^2 + z^2} \quad (16)$$

$$L_R(n, x, y, z) = \sqrt{(x - X_R(n))^2 + (y - Y_R(n))^2 + z^2} \quad (17)$$

$$b(n, t) \cong \quad (18)$$

$$\int_0^\infty \int_0^\infty \int_0^\infty e\left(t - \frac{L_T(x, y, z) + L_R(n, x, y, z)}{C}\right) r(x, y, z) \, dz \, dy \, dz$$

Eqn. 18 is the integral of the combination of eqns. 16 and 17. Eqn. 18 shows that the probe wave e(t) arrives at the receiver via a family of locations, an ellipsoid of points, with the same time delay. There is an inherent ambiguity in that the beam shape of the transmitting antenna shapes the spatial extent of the propagating probe wave, e(t), in a manner that reduces the illumination of the reflecting surfaces at various directions.

An approach to dealing with the ambiguity is to assume that the scatter that arrives at the receiver is mostly from the horizontal center between the transmitter and the receiver. This is the region where the angle of incidence is equal to the angle of reflection. However, there is no reason to assume that the geophysical layers are without a vertical incline. A vertical incline shifts the most likely position for the strongest reflection area.

There are several practical problems with the above analysis. The wave velocity, velocity dispersion, and attenuation versus distance change with frequency and resistivity. This complicates the analysis of the received signal. However, the principles are the same, with the caveat that an iterative approach is required to accurately render the reflection tomography or 3D resistivity in undistorted or shifted coordinates and amplitudes.

A further approach to dealing with the ambiguity is related to the process of detecting moving fluids in subsurface formations. The method described herein as it is applies to fracing relies on foreknowledge of both the depth location of the frac and the time over which the fracing will occur. Since all of the subsurface structure is static, signals arriving from those locations can be ignored in favor of those signals that are changing as the fracing process continues.

Consider now the coherent bi-static method. Most of the EM methods utilize square waves, ½ duty cycle square waves, and steps for excitation waves. These are poor waveforms for time of flight measurements. Periodic waveforms like square waves provide aliased position ambiguity at all but the very slowest periods. The low repetition rate for slow waveforms wastes energy because the scatter information is mostly in the edges. Pulses lower the transmitted power proportional to the duty cycle. This leads to the system described herein that provides for a designed probe wave, an example being a PRN sequence or a series of Walsh functions. The application of PRN codes to create a probe wave that has an auto correlation that approaches an impulse is well known and used in many fields but is poorly understood in the geophysical realm. The current level of understanding of the application of PRN codes in the industry can be understood from the following patents and papers:

"The development and applications of a wide band electromagnetic sounding system using a pseudo-noise source," Duncan, P. M. et al. (1980) ("Duncan");

"A Process and Device for Measurement of Spectral Induced Polarization Responses Using Pseudo Random Binary Sequence," Intl. Pat. App. No. PCT/IN2007/000603;

"Short-offset transient electromagnetic geophysical surveying," U.S. Pat. Pub. No. 20100201367 A1;

"Method for attenuating air wave response in marine electromagnetic surveying," U.S. Pat. No. 7,795,873 B2;

"System and method for detecting a fracture in a rock formation using an electromagnetic source," U.S. Pat App 20140239956; and "Comparison of pseudo-random binary sequence and square-wave transient controlled-source electromagnetic data over the Peon gas discovery," Anton Ziolkowski, et al. ("Ziolkowski"), all of which are incorporated by reference herein in their entirety.

The application of PRN codes in the geophysical field is described in Intl. Pat. App. No. PCT/IN2007/000603 and in Duncan.

There are several notable problems with the approaches described in the referenced material that prevent the technique from being used in anything other than determining the resistivity of near surface structures at less than 800 m depth and at a great distance from the transmitter. The techniques described herein overcome these limitations and allow the use of PRN codes in very deep investigations, beyond 800 m, and also extends its use to detecting the movement of materials of one resistivity, through surrounding subsurface strata with a different resistivity value. An example would be fracing fluid being injected into a shale subsurface structure.

In PCT/IN2007/000603 and Duncan, the PRN codes used are short in length, on the order of $2^7-1$ or a sequence length of 127. Each minimum switching period in a PRN code is termed a "chip" and can be understood by a person skilled in the art of PRN code creation.

In order to create a real time fluid monitoring system using a designed probe wave there are several items of additional teaching missing from both PCT/IN2007/000603 and Duncan.

A PRN code length that will provide effective isolation and real time results from depths far in excess of 800 m is longer than 127 chips. Therefore the backscatter received is spatially aliased. A longer code, say 8191 chips long, leads to a probe that is 64 times longer or deeper before becoming spatially aliased. In some embodiments, a PRN code sufficiently long to prevent spatial aliasing is used.

The length of time over which a PRN code is transmitted also has significant effects. In order to detect events that are occurring subsurface in real time in the receiving equipment the code must cycle within a reasonable time. This length of time is dependent on the rate of change of resistivity being monitored subsurface and also the maximum duration of time it takes reflected signals to diminish to a level that is undetectable by the system. This length of time may be as short as seconds and as long as minutes. Typically, for the detection of subsurface real time events something less than a 1 (one) minute transmission time is used.

U.S. Pat. No. 7,795,873 and US 200100201367 are specifically targeted to the offshore environment and are using PRN codes incorrectly. The techniques described suffer from severe restrictions in the application of PRN codes because of unknown or hard to quantify variability in position and time of the equipment. The described system must account for several errors created by the very nature of the recording method:

(a) The transmitters and, or receivers are in motion over the area of interest. The effect is to introduce unknown timing errors caused by Doppler effects introduced by wave action, imprecise speed control and imprecise location of the various components in the system. PRN codes are very sensitive to Doppler effects. This is an advantage if the transmitters and receivers are static but a problem when they are in motion.

(b) The chip rate is well below that required to take full advantage of PRN codes. This is likely caused by the power switching gear being used to transfer current into the ocean, in that it operates at low frequencies.

(c) There is an assumption that if very low frequency EM signals are to be recorded then acquisition rates can be very low speed and phase resolution can be recovered by very long sample periods and stacking. In a real time system or a system that resolves resistivity over a significant depth range, the results must be known in a reasonable time, at higher sample rates, with higher transmission rates, have very precise positioning and very precise timing.

"System and method for detecting a fracture in a rock formation using an electromagnetic source," Hoversten et al., U.S. Pat. Pub. 20140239956, is an application based on modelled data with no physical mechanism for making the measurements described. There are several problems that U.S. Pat. Pub. 20140239956 ignores.

(a) Hoversten describes a vertical electric dipole (VED) for the transmitter. The system described herein does not require a VED for the transmitter. The operational implications of drilling multiple 200 m holes for the transmitter VED are clearly a challenge. There are many practitioners in this field that have solved the problem by creating a virtual vertical electric dipole. An example may be found in "Focused-source electromagnetic survey versus standard CSEM: 3D modeling in complex geometries," by Davydycheva et al.

(b) Hoversten at [0019] states that the HED surface receivers can be commercially available multi-transient electromagnetic (MTEM) receivers or any type of commercial electromagnetic receiver used in hydrocarbon or mining exploration applications. This denotes a lack of understanding of the measurements to be made. As explained herein, extremely small signals that must be collected in the presence of a very large air and ground wave signal and no commercially available receiver and transmitter combination will function effectively.

Figure 4:
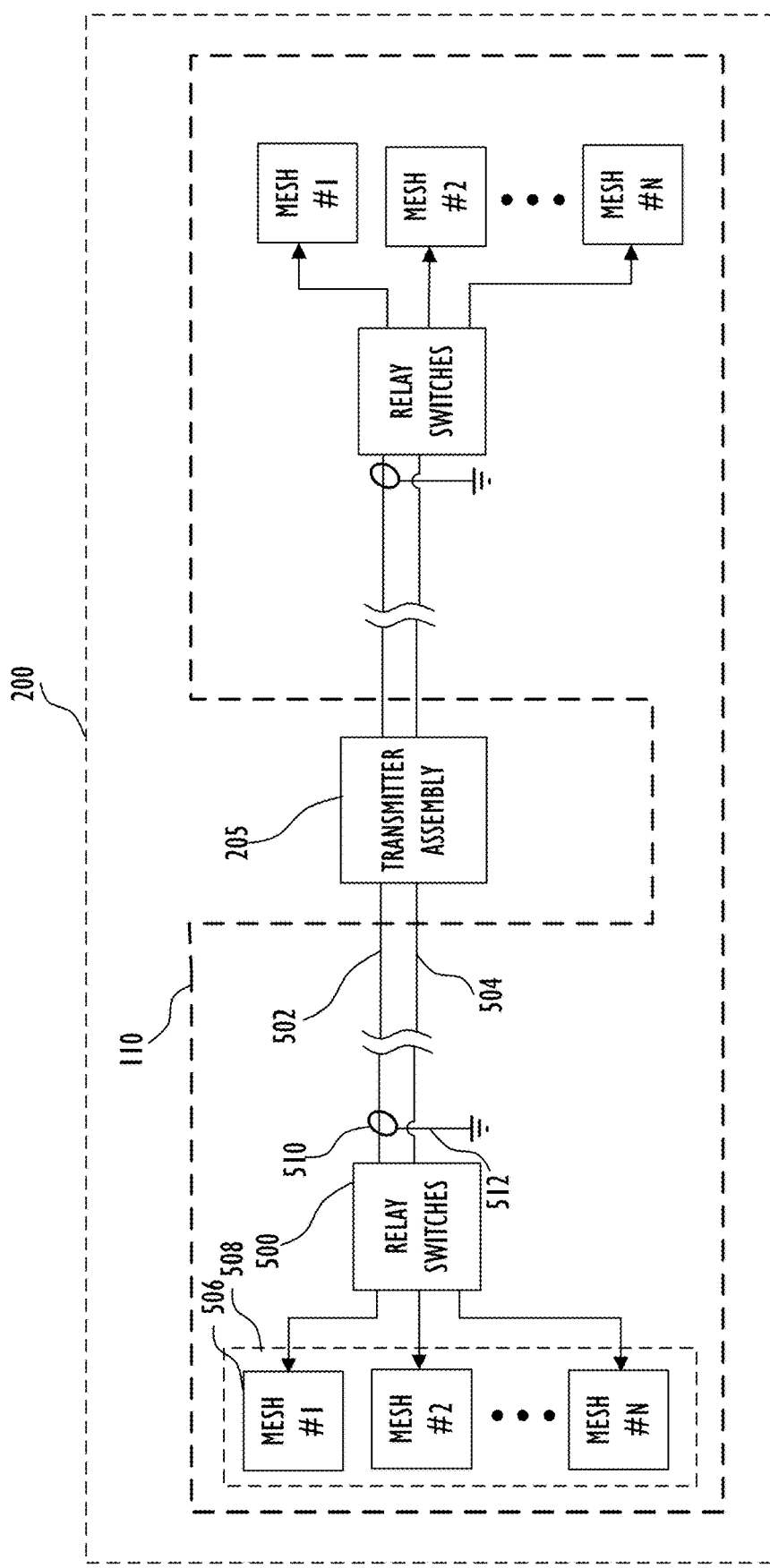
FIG. 4 depicts a schematic that is an overview of an antenna assembly for controlling feed point impedance according to one embodiment.
Figure 5:
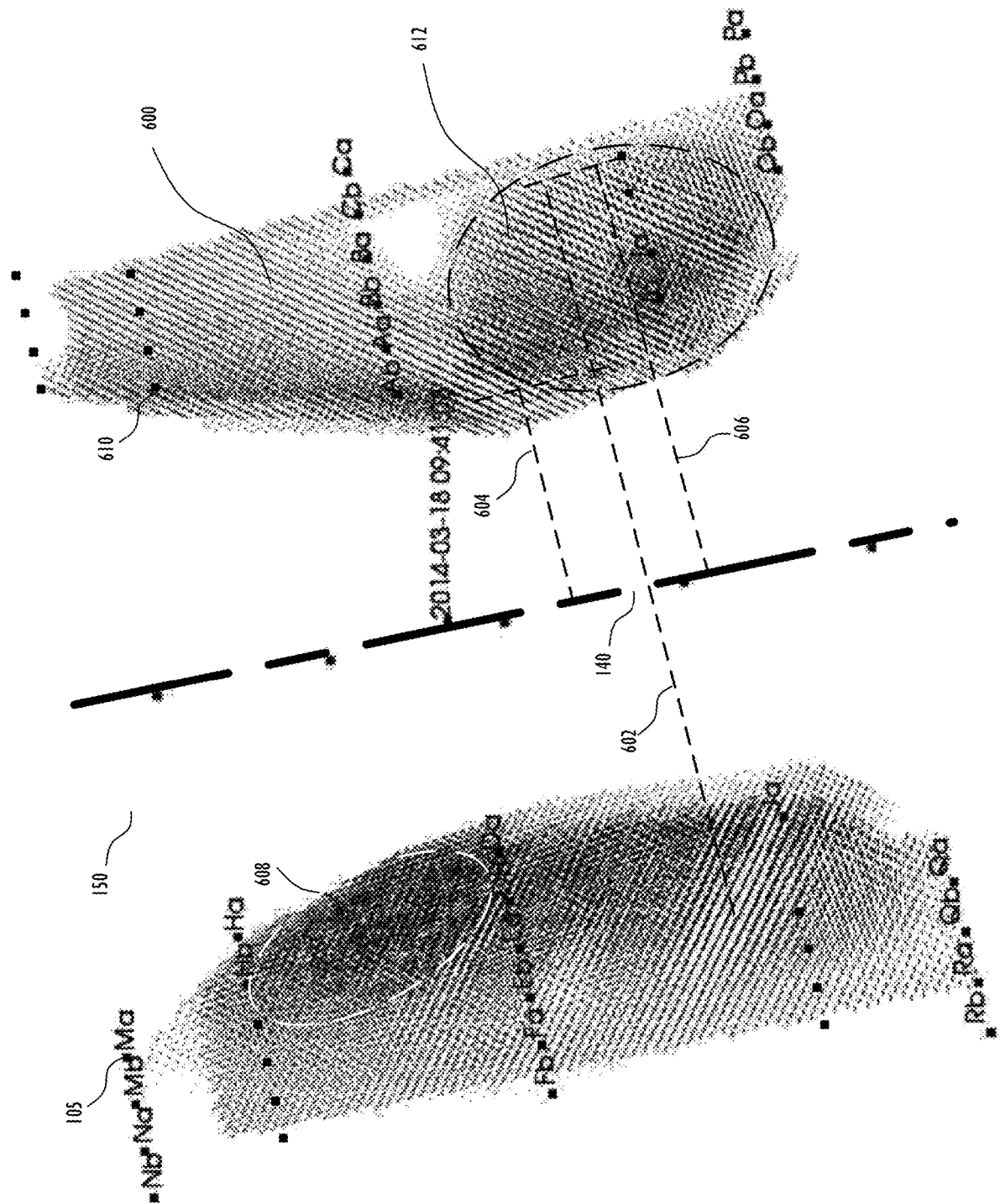
FIG. 5 is a horizontal image of data collected by a CSEM system according to one embodiment.

(c) FIG. 4 and FIG. 5 of Hoversten depict simulated data of a frac. Real data depicted in FIG. 5 of the current disclosure shows that the signal, received through planar intervening geology, can be found within the boundaries of the frac and in a shape representative of the frac. This emphasizes the need for forward modeling in order to resolve the location of the image at the surface relative to the subsurface frac operation, which further indicates the lack of understanding on the part of Hoversten.

Ziolkowski concludes that a PRN code has advantages over the more typical square wave transmissions conventionally used in CSEM. The paper relates to a very specific setup in the offshore environment, but demonstrates that the data used was of poor quality and replete with the limitations described, leading the community to a false understanding of PRN codes and their application. There are several problems in the paper.

(a) A basic limitation in the data collection is apparent in the abstract of Ziolkowski as it is stated that "The pseudorandom binary sequence data were acquired with a 10 Hz source bit rate but contain no information about the Peon gasfield at frequencies above 2 Hz." This is at least 8 times below the bit length required in order to have a fully effective PRN code to record responses from useful depths.

(b) The signal strength illustrated by Ziolkowski is very low because the measurements are made in the far field and therefore require significant stacking. As described herein, readings should be made in close proximity to the transmitter and the receivers should have sufficient dynamic range to avoid a need for significant stacking.

(c) The data displayed in FIG. 4 of Ziolkowski shows that there is very poor transmitter feed point impedance control, as is indicated by the variability of the output current over the length of the code, causing a significant source signature error. The primary indicator of the quality of a transmitted PRN code, and therefore source signature error, is a frequency domain power spectrum measurement that indicates the quality of the spectrum transmitted, as can be seen in FIG. 4(b) in Ziolkowski. This measurement is the difference in dB between the overall power level and the first null in the power spectrum. For the system described herein, the difference dB between the overall power level and the first null is typically in excess of −80 dB. In Ziolkowski, the spectrum is of poor quality and is displayed only on a linear scale. The power spectrum measurement value is distinct from the value of isolation in the cross correlation measurement.

(d) There is a further limitation of the system described in Ziolkowski in that the PRN code is not transmitted continuously. The system described herein recognizes that the subsurface response to the PRN code can be recorded at the same time it is being transmitted, near to the transmitter, and that the PRN code is transmitted continuously. PRN codes are cyclical codes, thus the inherent chip to chip isolation in cross correlation is greatly degraded in a non-cyclical (non-continuous wave) implementation.

(e) PRN codes are highly susceptible to Doppler effects. Moving the transmitter and receivers through the ocean is not well indicated when using PRN codes, especially when the EM waves are traveling at very low velocities.

(f) The spectrum display in FIG. 4(b) of Ziolkowski also indicates that the transmitted power is AC coupled to the transmitting antenna, because the data starts at low current near zero and rises over a small frequency range. This is additionally indicated in FIG. 4(a) since the source signature appears to be floating with no DC reference. This indicates that Ziolkowski does not understand that in order to have a correct spectrum when transmitting PRN codes, the DC component should be included.

Another important factor that is poorly understood in the referenced material is the PRN codes do have a DC offset that is proportional to the length of the code. The shorter the code, the greater the DC offset and the more a polarization effect will become dominant. As described herein, a PRN code should be transmitted continuously and the code length should be as long as possible in order to minimize the DC offset. This leads to the understanding that Induced Polarization is not an effect that is desired in the application of the method and system described herein.

In all of the referenced material the importance of very accurate timing, high data sample rates and high transmission rates is lost because the geophysical EM community thinks in terms of very low frequencies and therefore very low sample and transmission rates. As described herein, accurate timing over long periods of time allows coherent processing with high chip to chip isolation in cross correlation, and enables extremely stable magnitude and phase measurements in frequency transfer function measurements between the transmitted EM source wave and received EM backscatter waves.

The accurate transmission and timing of the PRN code provides for additional advantages in the processing techniques that can be used. The methods are not defined in the referenced materials because until the specified PRN code has been generated the methods are not usable. One advantage relates to the very accurate removal of air waves and near surface reflected waves from the received signal. The high chip to chip cross correlation isolation allows the air and near surface waves to be removed.

Because a PRN code is cyclic embodiments described herein also allow for the retrieval of finer detail, in the time domain, by processing the cross correlation data at increments of less than the PRN code cycle time.

The embodiments described herein have a basis in physics, modeling, and real data that show there is a significant advantage in applying correctly constructed PRN codes and probe waves to the application of geophysical surveying and real time monitoring of fracing, flow backs and EOR operations.

To be able to take advantage of these teachings requires a system that includes receivers with very high sample rates, in excess of 48,000 samples per second, very high dynamic ranges in excess of 130 dB and receivers and transmitters in the system, coherently timed to better than 100 nanoseconds in the time domain, over the duration of the measurement. In addition the system must be capable of switching transmitted power at very high speeds in order to preserve the signal content of a designed probe wave and with tightly controlled feed point impedance. The concept of feed point impedance can be understood by somebody skilled in the art of transmission systems. Some aspects of such receivers and transmitters are described in the following patent applications:

U.S. Patent Publication No. 2012-001818, filed Jul. 7, 2011;

U.S. Patent Publication No. 2012-0179372, filed Jul. 21, 2011;

U.S. Provisional Patent Application No. 61/648,305, filed May 17, 2012;

U.S. Provisional Patent Application No. 61/684,347, filed Aug. 17, 2012;

PCT Patent Application No. PCT/US2013/041691, filed May 17, 2013; and

U.S. Provisional Patent Application No. 61/879,990, filed Sep. 19, 2013; all of which are incorporated by reference herein in their entirety.

The system described herein provides additional teaching in the area of CSEM systems in the onshore sphere of operation.

For simplicity of understanding, consider the mono-static Eqn. 11 as a much reduced geophysical situation. Coherently correlating the transmitted signal, e(t), with the received backscatter signal, b(t), we obtain Eqn. 19:

$$R_{eb}(\tau) = \int_{-\infty}^{\infty} e(t)b(t+\tau)dt \cong \int_{-\infty}^{\infty} e(t) \int_{0}^{\infty} e\left(t - \frac{2z}{C} + \tau\right) r(z)dz\,dt \quad (19)$$

where C is the velocity of propagation. Reversing the order of integration, $$R_{eb}(\tau) \cong \int_{0}^{\infty} \left( \int_{-\infty}^{\infty} e(t)e\left(t - \frac{2z}{C} + \tau\right)dt \right) r(z)dz \quad (20)$$

The inner integral in Eqn. 20 is the autocorrelation of the transmitted signal.

Let's assume, for learning purposes, the auto correlation function of the transmitted signal is a Dirac delta function, then:

$$R_{eb}(\tau) = \int_{0}^{\infty} \delta\left(\tau - \frac{2z}{C}\right) r(z)dz = \frac{C}{2}r\left(\frac{C\tau}{2}\right) \quad (21)$$

The cross correlation, for a Dirac impulse transmission, e(t), is therefore the reflection density in space returned in a time series. It is not possible to create an infinite amplitude, zero time duration transmission signal. However, the thought experiment illustrates that a one dimensional backscatter's transfer function is the reflection density in space returned in time with time being proportional to the distance. The geophysical layers, and conductive nature of the layers, severely attenuates and distorts (via dispersion) wide bandwidth excitation signals. The attenuation of the conductive media also causes a great deal of signal energy to be absorbed rather than be returned to the receivers.

Since an impulse is impractical, and a great amount of signal is lost in attenuation, the transmitted wave, e(t), needs to be a repeated continuous wave to apply maximum output power, and to allow stacking of data. Under this condition, the transmitted wave e(t), needs to be a pulse compression waveform with a set of autocorrelation characteristics as follows:

Definition of transmitted wave e(t) and b(t) autocorrelation and cross correlation:

$$R_e(\tau) = \int_{-\infty}^{\infty} e(t)e(t+\tau)dt \quad (22)$$

$$R_{eb}(\tau) = \int_{-\infty}^{\infty} e(t)b(t+\tau)dt \quad (23)$$

Periodic Constraint on transmission, e(t), and reverberation constraint on scatter received, b(t):

$$R_e(0) = R_e\left(\pm n \frac{L_{MAX}}{C}\right); \quad (24)$$
$$n = 0, 1, 2 \ldots \infty$$

$$\lim_{L \to L_{MAX} - L_{RES}} R_{eb}\left(0 + \frac{L}{C}\right) \approx 0 \quad (25)$$

Where:

$L_{MAX}$ is greater than the longest distance of observation from transmitter to receiver $L_{MAX}$ is greater than the reverberation distance for the transmission $L_{RES}$ is the spatial resolution of the time-space cross correlation.

The transmitted signal must not repeat before the entire scatter has been returned to the receiver, and the scatter must die out before the transmitted signal repeats. This assures that the result is not aliased.

If the received signal is a combination of very large scattered signals, and very small scattered signals, the autocorrelation of e(t), $R_e(\tau)$, must have side-lobes about Re(0) that allow the smaller signals to be seen, and not swamped by autocorrelation side-lobes that bring in larger signals from other delays. This leads to the following constraint:

$$\left| \frac{R_e(\tau)}{R_e(0)} \right| < \frac{\min_{0<z<\infty} |r(x)|}{\max_{0<z<\infty} |r(x)|}; \quad (26)$$

$$\frac{L_{RES}}{C} < \tau < \frac{L_{MAX} - L_{RES}}{C}$$

Since an airwave, a ground wave, and an in-ground wave is usually the result of a transmission (due to practical design constraints on geophysical antennas), this constraint also includes the air and ground waves. The air and ground waves are usually much larger than the scatter from deep in-ground waves. Therefore, the additional constraints are required:

$$\left| \frac{R_e(\tau)}{R_e(0)} \right| < \frac{R_{eb}(\tau)}{R_{eba}(\tau)}; \quad (27)$$

$$\frac{L_{RES}}{C} < \tau < \frac{L_{MAX} - L_{RES}}{C}$$

$$\left| \frac{R_e(\tau)}{R_e(0)} \right| < \frac{R_{eb}(\tau)}{R_{ebg}(\tau)}; \quad (28)$$

$$\frac{L_{RES}}{C} < \tau < \frac{L_{MAX} - L_{RES}}{C}$$

Where:
$b_a(t)$: the receiver signal for the airwave
$b_g(t)$: the receiver signal for the ground wave $$R_{eba}(\tau) = \int_{-\infty}^{\infty} e(t) b_a(t+\tau) dt \qquad (29)$$

$$R_{ebg}(\tau) = \int_{-\infty}^{\infty} e(t) b_g(t+\tau) dt \qquad (30)$$

If these constraints are not met, the scatter signal will be aliased (several spatial regions are overlain on a return at the same amount of apparent delay), or swamped out by a larger signal that spills over, through side lobes of the e(t) autocorrelation, into another time delay region.

If these conditions are met by the autocorrelation properties of the transmitted signal, e(t), the following analysis shows that a 3D tomographic image is enabled. Continuing the mathematical development for bi-static scatter, the nth receiver detects the following for a transmission of e(t):

$$b(n, t) \cong \qquad (31)$$
$$\int_0^\infty \int_0^\infty \int_0^\infty e\left(t - \frac{L_T(x, y, z) + L_R(n, x, y, z)}{C}\right) r(x, y, z) \, dz \, dy \, dz$$

Cross correlating the received signal, b(t), with the transmitted signal, e(t), the following is obtained:

$$R_{eb}(n, \tau) \cong \qquad (32)$$
$$\int_{-\infty}^\infty e(t) \int_0^\infty \int_0^\infty \int_0^\infty e\left(t - \frac{L_T(x, y, z) + L_R(n, x, y, z)}{C} + \tau\right)$$
$$r(x, y, z) \, dz \, dy \, dz \, dt$$

Performing the cross correlation:

$$R_{eb}(n, \tau) \cong \qquad (33)$$
$$\int_0^\infty \int_0^\infty \int_0^\infty R_{eb}\left(\tau - \frac{L_T(x, y, z) + L_R(n, x, y, z)}{C}\right) r(x, y, z) \, dz \, dy \, dz$$

Obeying the constraints on the autocorrelation of e(t), the cross correlation for the bi-static cause receives a ellipsoid group of points for every time delay $\tau$. The ellipsoid is defined by the equality:

$$C\tau = L_T(x,y,z) + L_R(n,x,y,z) \qquad (34)$$

By recording the signals b(n,t) from each receiver, the position of the receivers, the position of the transmitter, and the calculated $R_{eb}$ (n, $\tau$) cross correlations can be used to beam-form out the ellipsoidal ambiguity of the delays into a 3D topographical plot of the reflections.

Considering coherence, stacking, superposition and Time-Differential Measurements ("TDM"). A consequence of the coherent techniques for EM reflection data logging and 3D coherent EM tomography as taught by the invention is the inherent stacking and superposition.

Stacking is the process of coherently adding a periodically repeated signal. The signal repeats and noise that is not coherent with the signal does not. As the signal is stacked, the power of noise increases as N and the power of the signal increases as $N^2$. Therefore the voltage or current power Signal to Noise Ratio increases as 10 log(N). Given this condition, any Signal to Noise ratio can be achieved given enough time and averages. This a useful advantage that allows a very small signal to be recovered out of the noise floor of amplifiers, and receiver systems. However, stacking is not a requirement of all embodiments described herein.

When the transmitting signal is coherent, and repeatable, the measurement of a large area can be accomplished with a single transmitter and a single receiver by superposition. The transmitter and receiver or receivers can be moved around, and the resulting measurements and recordings can be superimposed upon each other to form a much denser spatial sampling rate, and much larger effective aperture with a small amount of equipment. Because linear superposition applies, the effective number of receivers and transmitters can be multiplied by the number of trials. Sensing equipment sufficient for an area, can be multiplied to many times that area by multiple measurements, moving the equipment a recording again, and utilizing superposition for the final formation of an expanded aperture in the signal processing analysis. Assuming the geology does not change, the coherent processing allows the measurements to be conducted at any amount of delay between measurements.

The fact that superposition applies also provides another important capability: time-differencing for geology that is changing. The measurement of changing geology in real time is a capability provided by various embodiments.

Various embodiments transmit a purpose-designed EM probe wave with an "impulse" like broadband autocorrelation (or "white"-noise like frequency response). This purpose-designed EM probe wave provides the following characteristics:

(a) "impulsive" autocorrelation with a strong zero-delay autocorrelation peak that is significantly larger that the non-zero delay autocorrelation floor, or side-lobes; and (b) The autocorrelation peak decreases from zero-delay for both positive and negative delays.

The magnitude of the absolute value of the zero-delay autocorrelation peak divided by the maximum magnitude of the absolute value of the non-zero delay autocorrelation floor (the peak to floor ratio) must be larger than the magnitude of the largest airwave, ground wave, or geophysical scatter amplitude divided by the smallest geophysical wave scatter amplitude received. The largest scatter or non-scatter wave to smallest geophysical scatter amplitude ratio must be smaller than the autocorrelation zero-delay peak to autocorrelation non-zero delay floor peak ratio. This assures that the smallest geophysical EM scatter is not masked by autocorrelation side lobes bringing in larger signals to mask the smaller signal.

The "impulsive" autocorrelation zero-delay lobe must be narrow in width. The zero-delay autocorrelation lobe must be narrow enough to achieve measurement spatial resolution requirements. The narrower the width the zero-delay autocorrelation peak, the higher the spatial resolution.

If the transmitted EM wave is periodic, the autocorrelation will be periodic and the zero-delay lobe of the autocorrelation will be repeated at the period of the EM wave. The period of the transmitted EM wave must be:

(a) long enough in time for the geophysical wave to propagate from the surface to the deepest depth of investigation back up to the furthest distance surface receivers without repeating (this forces the periodic autocorrelation of the EM probe wave to have zero-delay peaks, and periodic replicas to be far enough apart to unambiguously determine distance, and features of the geophysical media: anti-aliasing criteria);

(b) long enough in time for the geophysical wave scatter to have attenuated, died down, enough to not be an aliasing factor, or effect the measurement noise floor; and (c) long enough in time to create a density of frequency tones that is sufficient to produce smooth phase difference and amplitude ratio plots for geophysical transfer function measurements (ratio of the Fourier transform of the geophysical scatter to the Fourier transform The EM probe wave is optimally non-stochastic:

(a) By being known a priori, coherent stacking can be applied to average out measurement noise.

(b) By being known a priori, any signal to noise ratio can be achieved by stacking received scatter signals by a sufficient number of coherent averages.

(c) By being known a priori, the airwave and ground wave can be cancelled either at the front end of the receiver, or later during signal processing of the received signals.

PRN codes are a stream of binary bits that are generated via linear feedback shift registers in one embodiment. They are categorized by the code generator shift register length. A N-bit shift register produces an $2^N-1$ bit PRN code. The feedback is taking the Nth shift and one or three other shift register taps, applying an exclusive OR (alternatively, an exclusive NOR) to these two or four bits, and feeding this binary value back to the input of the shift register. Only certain combinations of taps lead to production of maximum length PRN codes.

A PRN code sequence repeats after $2^N-1$ clock periods. A set of shift register taps that produce a sequence that is $2^N-1$ long is the generator for a maximum length sequence, or PRN code.

A PRN sequence has a unique set of properties. The PRN sequence produces a set of equally spaced, harmonically related, frequencies. The first harmonic frequency is equal to:

$$f_0 = \frac{f_p}{(2^N-1)} = \frac{1}{(2^N-1)T} \quad (35)$$

Where:

$f_0$ is the $1^{st}$ harmonic, base frequency, for harmonic series of tones comprising the PRN spectrum N is the generating shift register length for the PRN code T is the duration, in time, of the bits (sometimes called chips) in the PRN sequence $f_p$ is the generating clock, the shift register clock, for the PRN code The amplitudes of these harmonically related frequencies are almost equal at low frequency compared to fp. This is almost like a "white noise" spectrum, hence the name "pseudo-random."

When the binary bits are represented by −1 for a "0" and +1 for a "1", the autocorrelation of a N-bit shift register PRN code, p(n), is:

$$R_p(m) = \frac{1}{2^N-1} \sum_{n=0}^{2^N-2} p(n+m)\, p(n) = \quad (36)$$

$$\begin{cases} 1, & m = 0, \pm(2^N-1), \pm 2(2^N-1), \pm 3(2^N-1), \ldots \\ & \text{otherwise} \end{cases}$$

The autocorrelation is 1 with zero or multiples of $2^N-1$ delay, and greatly reduced to $-1/(2^N-1)$ at every other delay.

If the PRN generating shift register clock has a period T, or frequency of $f_p$, then the period of the PRN sequence is $(2^N-1)T$, or $(2^N-1)/f_p$. If the sequence is periodic, then the autocorrelation is periodic, with period $(2^N-1)T$.

If each bit of the sequence of the PRN code (often called a "chip") lasts T seconds long, the continuous time sequence becomes p(t) and has the autocorrelation:

$$R_p(\tau) = \frac{1}{(2^N-1)T} \int_{t_0}^{t_0+(2^N-1)T} p(t)p(t+\tau)\,dt \quad (37)$$

$$R_p(\tau) = \begin{cases} 1 - \left|\frac{\tau}{(2^N-1)T}\right|; & m(2^N-1)T - T \le \tau \le m(2^N-1)T + T; \\ & m = 0, \pm 1, \pm 2, \ldots, \\ \frac{-1}{2^N-1}; & m(2^N-1)T + T < \tau < (m+1)(2^N-1)T - T; \\ & m = 0, \pm 1, \pm 2, \ldots, \end{cases} \quad (38)$$

The continuous time autocorrelation shows a triangular pulses at τ=0, and multiples of the prn code period $(2^N-1)T$. The triangular pulses are unit height and are 2T wide at the base. The base is $-1/(2^N-1)$. The autocorrelation at all over delays is at the base: $-1/(2^N-1)$.

Therefore the side lobe level of the autocorrelation is:

$$\text{Maximum Side Lobe} = MSL = \left|\frac{-1}{2^N-1}\right| \quad (39)$$

Maximum Side Lobe (dB) = (40)

$$MSL(\text{dB}) = 20 * \log 10\left(\left|\frac{-1}{2^N-1}\right|\right) \cong -6.02\, N\, \text{dB}$$

The −MSL is the number of dB attenuation of anything outside the peak correlation window of 2T width.

In the discussion of one dimensional mono-static scatter principles and coherent bi-static methods set forth above, the EM Probe Wave e(t) is transmitted into a geophysical medium with depth, or depth and position offset dependent refection density r(z) or r(x,y,z). The reflection density is result of spatial changes in the geophysical properties resistivity, EM permeability and permittivity. The scatter EM signal, b(t), arriving at a receiver, described herein, is the result of scatter of the EM Probe Wave, e(t), off of the geophysical features that cause the reflection density. The description below describes a good choice of e(t). The waveform for e(t) is a significant feature of various embodiments. The e(t) waveform must be purposed-designed, as described herein, to give the system the following capabilities:

The ratio of the largest signal at the receiver to the smallest scatter signal at depth as it returns to the receiver must be greater than the absolute value of the PRN autocorrelation base (MSL constraint). The largest signal for the ratio might also include the airwave or ground wave in the dynamic range consideration. The MSL constraint is also known as the isolation of the PRN auto correlation and is preferably above −78 dB.

The scatter signal must attenuate down before the PRN code repeats (Period constraint).

The spatial resolution meets the following requirements: MSL Constraint:

$$\left|\frac{\text{Minimum Signal}}{\text{Maximum Signal}}\right| > MSL = \left|\frac{-1}{2^N-1}\right| \quad (41)$$

Periodic Constraint:

$$\frac{L_{MAX}}{C} = (2^N - 1)T \quad (42)$$

or $$L_{MAX} = (2^N - 1)CT \quad (43)$$

Spatial Resolution:

$$\frac{\Delta L}{C} > T \text{ or } \Delta L > CT$$

$L_{MAX}$ path distance must greater than the distance at which the scatter signals fall below side lobe correlation concerns.

The harmonic series of tones can be tuned by the PRN sequence clock, $f_p$ or equivalently $1/T$, to de-correlate the sequence from coherent noise from 50 or 60 Hertz power line noise, or other coherent noise sources.

The PRN side lobe rejection is $20 \log(2^N-1)$.

The PRN signal to noise gain against noise is $10 \log(2^N-1)$.

The PRN based correlation method allows superposition:

The transmitter can be multiple transmitters or moved about as desired.

The receivers can be moved in time and space, and the data collected coherently superimposed.

All the disparate measurements, coherently obtained, can be superimposed upon each other to create a larger aperture, and greater stacking, and thus obtain greater resolution.

These constraints are all reachable via PRN codes. The spatial resolution constraint is met by tuning the sampling period, T. The Periodic Constraint is met by choosing the $L_{MAX}$ estimating C for the lithology of the measurement region, and then tuning N (the shift register length) for the PRN code to achieve $L_{MAX}$ at that velocity, C. The MSL constraint is tuned again by choosing N to meet the maximum to minimum signal ratio constraint. The largest required N for any of the constraints is utilized to meet or beat all constraints.

After surveying the literature on EM Wave geophysical measures, the system described herein is unique. The embodiments are successful in finding "reflections" that are considered non-existent by the overwhelming number of practitioners of EM geophysical measurements, probably because the constraints discussed above are not understood or considered.

There have been several attempts to use PRN codes but all have concentrated on near surface responses. This limitation is mainly caused by a poor understanding of the implementation and design of the PRN or pseudo-random binary sequence (PRBS) codes (PRN codes are a form of PRBS codes). The new technique described herein allows for imaging of subsurface structures in the far field below the receiving sensors using designed PRN codes.

In an alternate embodiment a set of Walsh functions can be transmitted. Walsh functions are an orthonormal basis function set comprised of a set of binary waveforms. By sequentially transmitting a complete or partial set of Walsh functions and recording the EM scatter, the set of received signals can be combined to create any arbitrary periodic waveform, including an impulse. This secondary weighted summation of waveforms can serve in the same capacity as the PRN code in the previous discussion. Side lobe rejection and other properties can be tuned to obtain PRN similar results. Embodiments include Walsh function derived waveforms as an EM Probe wave $e(t)$.

The transfer function and correlation methods described above for PRNs also apply to Walsh Functions.

In another alternate embodiment a Chirp Waveform can be transmitted. A Chirp Waveform is a chirping square wave, the frequency varied to some a priori pattern, and is another way to generate an EM Probe Wave, $e(t)$.

The transfer function and correlation methods described above also apply to Chirp Waveforms.

In a further alternate embodiment a Random Binary Sequence can be transmitted. An arbitrary Random Binary Sequence is another way to generate an EM Probe Wave, $e(t)$. The binary sequence may be stored in a storage device or random access memory and transmitted.

The transfer function and correlation methods described above also apply to Random Binary Sequences.

In another embodiment a purposed designed binary sequence can be transmitted.

An arbitrary purposed designed binary sequence is another way to generate an EM Probe Wave, $e(t)$. The binary sequence may be stored in a storage device or random access memory and transmitted.

The transfer function and correlation methods described above also apply to a purposed designed binary sequence.

The described designed waveforms must be created from a system of equipment that is capable of satisfying the requirements defined herein.

Referring to FIG. 1, one or more receivers 105 and one or more of a transmitter antenna assembly 110 are placed on a surface 100 in a way that increases the measurement diversity. A plurality of receivers 105, are laid on the surface 100 to form a receiver matrix 115. The total extent of the receiver matrix 115 does not exceed the antenna length and in various embodiments may extend from less than 15 m. from the transmitter antenna assembly 100 to several kilometers away. Typically the location of each receiver in the receiver matrix 115 is defined by a forward model. Forward modeling can be understood by a person skilled in the art of geophysical forward modeling. In one embodiment this matrix of receivers 115 can be randomly spaced over the surface 100. In an alternate embodiment additional receivers 120 are placed at a distance from the receiver matrix 115 to provide for an interferometric measurement system.

There are three types of waves depicted in FIG. 1. These are the airwave 125, the ground wave 130 and the geophysical wave 135. The combination of the airwave 125, the ground wave 130 and the geophysical wave 135 is the designed probe wave.

The airwave 125 is an EM wave that radiates into the air and space above the ground and geophysical media. The airwave 125 is prevalent in near field measures (measurements near the transmitting antenna), and travels at near the EM wave velocity of a vacuum. The airwave 125 provides no useful geophysical information.

The ground wave 130 is an EM wave that radiates along the air-ground surface boundary, and may scatter off of surface objects, for example: vehicles, buildings, mountains, and trees. The ground wave 130 is prevalent in near field measures (measurements near the transmitting antenna) and at some distance beyond. The ground wave 130 can be substantially stronger than the ground penetrating wave, and travels at velocity determined by the air and ground EM parameters but the velocity is lower than the vacuum wave velocity due to the ground interface. The ground wave 130 is slightly to moderately dispersive. The ground wave 130 provides very little useful geophysical information, and the little information provided by the wave is only about the geophysical surface.

The geophysical wave 135 is an EM wave that radiates into the ground, scatters off of geophysical media resistance changes, and reflects or refracts back to the surface. The geophysical wave 135 travels at a velocity determined by the traversed geophysical media resistivity, EM permeability and permittivity, and the frequency of the EM wave. The ground wave 135 is dispersive and travels at a velocity that is less than one to five orders of magnitude smaller that the velocity in a vacuum.

As disclosed herein, the geophysical wave 135 travels through the intervening layers to the layer of interest 150 that contains the subsurface borehole 140, reflects or refracts off the different conductive materials in the subsurface layers 145 and 150, and sets up a secondary field that is apparent at the surface 100. The secondary field does not vary over time. However, when a fluid, for example a hydraulic fracturing fluid, of different resistance from the surrounding subsurface layer 150 is introduced through the borehole 140 the secondary field changes. The changes are recorded at the surface 100 by the receiver matrix 115.

Various embodiments disclosed herein are designed to detect the very small changes in the secondary field at the surface 100 and exclude the majority of the responses from intervening static structures that are the subsurface layers 145, ground wave 130, and airwave 125, noise.

In another embodiment, the system is designed to detect the very small changes in the secondary field at the surface 100 that are as a result of EOR operations subsurface. The positioning of the receivers for measuring EOR signals is above the area between the injection well and the receiving wells. The angle from the transmitter to the object layer and the surface receivers is very small.

In another embodiment the system is used to detect the resistance changes from static structures within the subsurface formation.

In order for the secondary field caused by the subsurface resistance changes to be detected at the surface 100 and typically within the area defined by the receiver matrix 115, the equipment of the system requires very specific functionality.

The one or more transmitters 110 are tightly synchronized with one or more of receivers 105 and one or more of the receiver matrix 115.

The coupling of the transmitter antenna assembly 110 to the surface 100 is very important to the correct generation and transmission of the signal being transmitted. The value of the feed point impedance should be carefully controlled.

Figure 2:
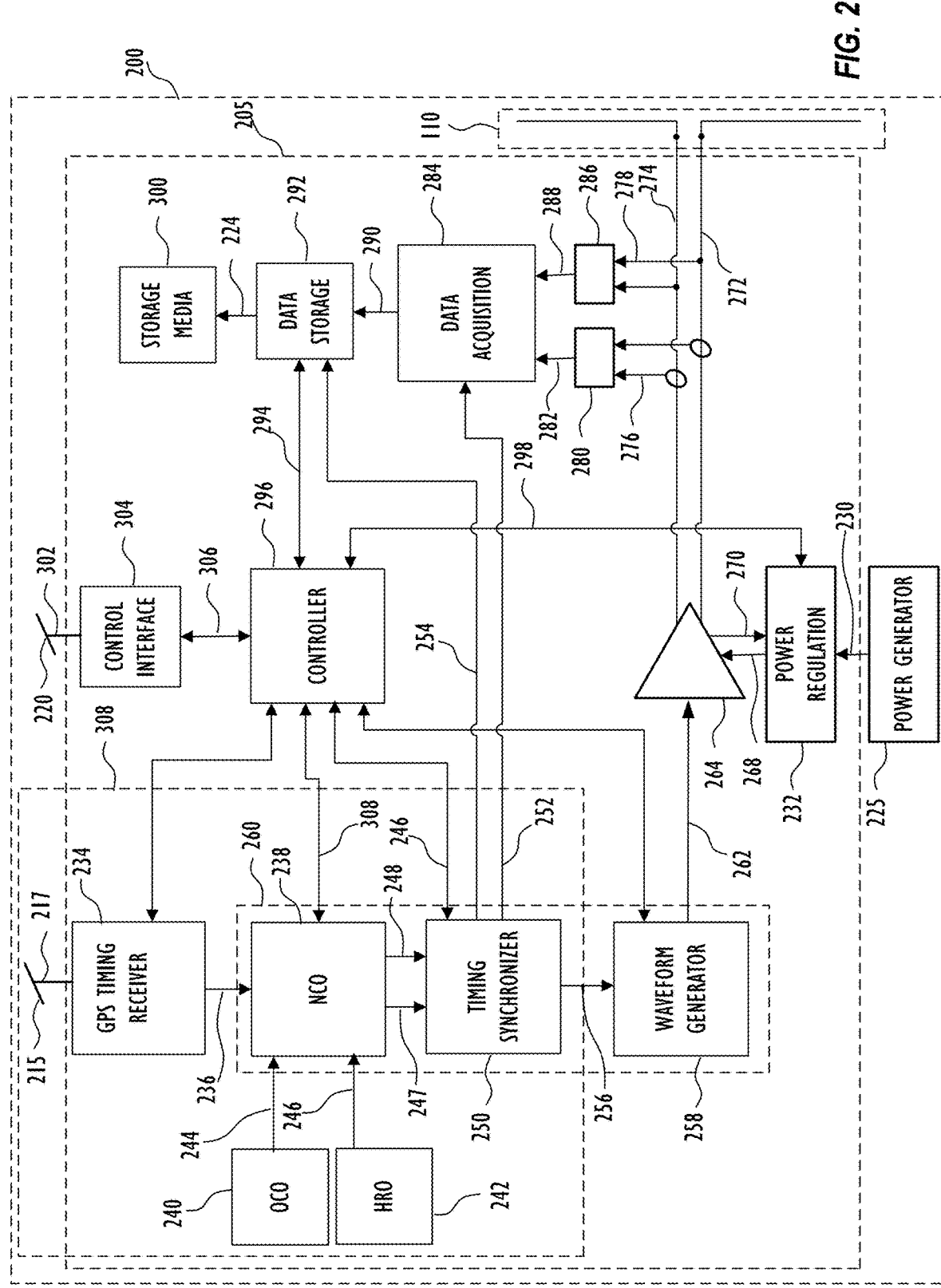
FIG. 2 depicts a schematic that is an overview of the circuit components for a transmitter according to one embodiment.

Referring now to FIG. 2, the EM probe wave transmitter assembly 200 contains the transmitter assembly 205, the transmitter antenna assembly 110, the Global Positioning System (GPS) signal antenna 215, the command and control (C&C) signal antenna 220 and the power generator 225. The power generator 225 is typically a generator designed for aircraft support and can output alternating current (AC) or DC power. In one embodiment the power generator 225 is capable of providing a 400 Hz 3 phase AC at 220V and 70 Amps of current. The output from the power generator 225 is connected conductively 230 to the transmitter assembly 205 and to the power regulation system 232.

The transmitter timing control module 308 contains the GPS signal antenna 215, the GPS timing receiver 234, the numerically controlled oscillator (NCO) 238, the oven controlled oscillator (OCO) 240, the high rate oscillator (HRO) 242 and the timing synchronizer 250. The GPS signal antenna 215 is conductively connected 217 to the GPS timing receiver 234. The GPS timing receiver 234 produces a one pulse per second 236 (1 pps) globally synchronized digital pulse that is conductively coupled to the NCO 238. The OCO 240 is conductively coupled 244 to the NCO 238. The clock generated by the HRO 242 is conductively coupled 246 to the NCO 238. The OCO 240 is converted through a phase-locked loop (PLL) within the NCO 238 up to 320 Mhz clock 247. In one embodiment, the HRO 242 is a NBXSBB023 400 Mhz LVPECL clock oscillator selected for 20 ppm accuracy, manufactured by On Semiconductor of Phoenix, Ariz., the OCO 240 is a OX9143S3-020.0M manufactured by Connor-Winfield, and the GPS timing receiver 234 is Resolution SMTx selected for timing accuracy and manufactured by Novotech.

A high rate clock, greater then 300 MHz, is used to obtain the timing resolution needed for the system described herein. The high rate clock is both phase and frequency accurate over very long periods. A high rate clock greater than 300 Mhz is used because the clock corrections must occur in one clock cycle in order to be in the 3 nanosecond or less timing region. The high rate clock is also desirable because creating low rate clocks from a high rate clock limits the introduction of phase and frequency errors. A frequency and phase accurate high rate clock is not available on the market in a technology format that is field worthy.

Even though the system includes the timing based GPS receiver 234 that provides both 10 Mhz and programmatically 25 Mhz low rate clock outputs, they are not used because these clocks have large jitter and therefore undetermined timing between the GPS 1 pps clock pulse of the GPS receiver 234. The GPS receiver 234 1 pps clock has jitter that is a combination of random and statistical affects. In addition, using the low rate clock that is provided by the GPS receiver 234 to create phase and frequency accurate clocks at the high clock rate increases the phase noise in the system. This leads to the recognition that a phase and frequency accurate high rate clock that is better than 2 ppb can be created by using the GPS receiver 234 output 1 pps clock 236, which is time accurate over very long periods of time (years), to train a second high rate clock, created using a PLL to multiply up a low rate clock that is stable over short periods of time (days) to a high rate clock and filtering the output to remove jitter or phase error. The relationship between the 1 pps clock 236 from the GPS receiver 234 that is accurate to less than 15 ppb at 1 standard deviation, the error being mostly statistical that generates high rate clock outputs that are high in jitter, the HRO 242 that has low jitter or high phase accuracy but drift at 20 ppm and 3-5 ppm per year, and the low jitter OCO 240 that has frequency accuracy to 1 ppb at 25° C. for a short period of time are extremely important to the implementation of the system low rate clocks provided at the outputs of the timing synchronizer 250.

The OCO 240 is up-converted to a 320 Mhz high rate clock by a PLL within the Field Programmable Gate Arrays (FPGA) 280. In order to achieve a frequency accuracy of better than 20 ppb with very low phase error or jitter the 320 Mhz high rate clock 247 is trained by adjusting two very large cyclic counters (greater than 64 bits) continuously in order to control the programmable output low rate clocks 252, 254, and 256 from the timing synchronizer 250 to better than ⅛ Hz of variability for long periods of time. In another embodiment the HRO 242 clock is combined and trained within the timing synchronizer 250.

The 320 Mhz output high rate clock 247 of the NCO 238 is conductively coupled to the timing synchronizer 250. In a preferred embodiment, the timing synchronizer 250 outputs a 25.6 MHz low rate clock 252 to the data acquisition controller 284, which is synchronized system wide through the GPS receivers, to the data acquisition controller 434 in each of the receivers 105.

In one embodiment, the two very large cyclic counters are created within the FPGA 260 and are part of the timing synchronizer 250. Each cyclic counter runs at the full clock rate of the FPGA 260. In one embodiment, the clock rate of the FPGA 260 is 320 Mhz, a high rate clock. Only the first cyclic counter is adjusted; the second cyclic counter is allowed to free run. In one embodiment there is only one clock period available to read the second cyclic counter and then correct the first cyclic counter with the filtered results, in order to achieve better than ⅛ hz resolution in the 25.6 Mhz output low rate clock 252. The first cyclic counter is adjusted by the error count detected in the second cyclic counter after the error count has been filtered. The error count is the difference between the expected count value and the actual value read at the occurrence of the GPS 1 pps clock 236. The second cyclic counter is read at the occurrence of the GPS 1 pps clock 236 to determine the error count, but the second cyclic counter is not adjusted. In one embodiment, the error count calculated from the second cyclic counter is passed through two filters. The first filter is designed to use the error count to adjust the first cyclic counter value to within a few ppm of the correct count within a 1 second period (fast convergence). The second filter is designed to produce a slowly changing error count that brings the first cyclic counter to an average value for a 320 Mhz high rate clock with very low phase error and high frequency stability of within 3 ppb, within several seconds. In one embodiment the two filters are windowed averages of different lengths. The first cyclic counter is used to create the output low rate clocks 252, 254, and 256. In this way an accurate high frequency high rate clock is used to derive all the lower frequency low rate clocks required by the system, intrinsically avoiding the problem of increasing phase noise or frequency error when using a 1 pps clock or low rate clock to create a high rate clock.

In another embodiment, the FPGA 260 is selected for much higher clock rates, greater than 320 MHz, in order to increase timing resolution and allow for substantially more internal clock cycles to allow for more large register operations.

In an alternate embodiment, the timing synchronization 250 can train the output low rate clock by using a GPS 1 pps clock and an oscillator that is capable of generating a high clock rate output, much greater than 20 Mhz, with improved jitter and phase drift specifications. This can be accomplished by an oven controlled clock of appropriate specification. Atomic clocks, such as the Quantum SA.45s CSAC manufactured by Microsemi of Aliso Viejo Calif., are still expensive to implement in every receiver and have export restrictions that apply and so are not currently useful in the application. However, an atomic clock of this design would require the same training technique to ensure system wide synchronization.

Referring now to FIG. 1, in an alternate embodiment related to the proximity of the receivers 105 in the receiver array 115 to the transmitter assembly 205, each of the receivers 105 and transmitters 110 can be conductively coupled in a way that will provide for a centralized clock synchronization signal. This embodiment is a benefit achieved from placing the receivers 105 close to the transmitters 110, enabling the system to measure the small signals from deep within the object strata.

Referring again to FIG. 2, the clocks described above are only one example of how several clocks with different phase accuracy, jitter and frequency accuracy can be combined and trained using a GPS 1 pps clock to create a clock with improved phase accuracy and jitter.

The NCO 238, timing synchronizer 250 and waveform generator 258 are all sub-components of the one or more FPGA 260. In one embodiment of the invention the programmable output clocks 252, 254, and 256 from the timing synchronizer 250 are accurate and stable over time to 3 ppb.

The waveform generator 258 contains the predesigned probe waveforms that are transmitted. The waveform generator 258 is coupled 262 to the antenna driver 264. The coupling 262 is an optically isolated coupling. In one embodiment, the antenna driver 264 is a PowerEx Module PP100T 120 manufactured by PowerEx of Youngwood Pa. The antenna driver 264 switches the signal on the transmitter antenna assembly 110 with a PK-PK switch time of 60 micro seconds in bit-period. However, measurements indicate that the IGBTs are switching from full positive to full negative supply in less than 6 microseconds under the resistive-capacitive loads typically encountered in the geology. The quality of the output waveform is very dependent on the switching time of the antenna driver 264. The power regulation module 232 is conductively coupled 268 to the antenna driver 264. The antenna driver 264 is conductively coupled 272 and 274 to the transmitter antenna assembly 110 and switches the power from the power regulation module 232 to the transmitter antenna assembly 110.

Controlling the power provided to the transmitter antenna assembly allows the system to maintain the quality of the transmitter signal. One or more of the current sensor 276 signals is conditioned by the signal conditioner 280, which is conductively coupled 282, to the data acquisition module 284. One or more of a voltage sensor 278 signal is conditioned by the signal conditioner 286, which is conductively coupled 288, to the data acquisition module 284 that digitalizes the signals. The data acquisition module 284 is conductively coupled 290, to the data storage module 292. In one embodiment, the data acquisition module 284 collects data with a sample rate equal to or in excess of 48,000 samples per second per channel at greater than 20 bits of resolution. The data storage unit is conductively coupled 224 to the storage media 300. The storage media 300 can be of any commercially available bulk memory system. In one embodiment, the storage media 300 is synchronous dynamic random-access memory (SDRAM) of equal or greater than 32 gigabytes of storage. The data storage unit 292 is also conductively coupled 294 to the controller 296. The controller 296 is conductively coupled 298 to the power regulation module 232. The controller 296 is also conductively coupled to the waveform generator 258 of the FPGA 260. The current sensor 276, data and the voltage sensor 278, data enable the system to calculate the feed point impedance of the antenna assembly 110. The calculation of the feed point impedance provides a process variable that is fed into a proportion integral (PI) controller within the controller firmware contained within 296. The control variable output of the PI controller within the controller 296 is conductively coupled to the power regulation unit 232. The DC power conductively couple 268 to the antenna controller 264, is varied in order to provide control of the power conductively coupled 274, to the antenna assembly 110. As the feed point impedance changes the output power is varied to compensate.

The current sensor 276 data and the voltage sensor 278 data are also used in the calculation of the primary measurements of the system, amplitude ratio, phase difference and cross correlation amplitude and provide the reference for these measurements.

The C&C signal antenna 220 is conductively coupled 302 to the control interface 304. The control interface 304 is conductively coupled 306 to the controller 296. The C&C interface can be any system that allows for a broadcast of command signals and return data. In one embodiment, the C&C interface 304 is based around the ZIGBEE® protocol and chip set. (ZIGBEE is a registered trademark of The Zigbee Alliance.) An example of the C&C interface 304 is the XBee-PRO 900 HP RF module manufactured by Digi International. The C&C interface 304 is used to wirelessly control the EM probe wave transmitter assembly 200. In addition the C&C interface 304 is used to transfer low data rate items between the base station 155, transmitter 205, the receiver array 115, and other receivers in the system 105 and 120.

The C&C interface 304 can be any system that allows for the transfer of setup parameters, waveforms, and other data.

Referring now to FIG. 1, knowing the feed point impedance enables the transmitter assembly 205 to control the power conducted to the antenna assembly 110 and improve the quality of the transmitted probe wave or geophysical wave 135. There are several indicators of the quality of the designed probe wave 135 and how it couples to the surface 100. The primary indicator is a frequency domain power spectrum measurement that indicates the quality of the spectrum transmitted. This measurement is the difference in dB between the overall power level and the first null in the power spectrum. In various embodiments, this is typically in excess of −80 dB. The value is distinct from the value of isolation in the cross correlation measurement.

Referring now to FIG. 4, feed point impedance can be controlled in various ways. In one embodiment, the antenna assembly 110 includes a power relay assembly 500 that is controlled by the transmitter assembly 205. The transmitter assembly 205 provides power to the relay switches 500 through conductively coupled line 502. The transmitter assembly 205 controls the relay switches through a control line that is conductively coupled 504 to the relay switch 500. Combinations of in-ground wire mesh 506 within the wire mesh array 508 or in-ground conducting rods can be selected in order to control the total power injected into the ground as a results of the feed point impedance calculated by the transmitter assembly 205.

In a further embodiment a drip irrigation system provides for the constant application of fluid to the wire mesh array 508 during the field operation. This further controls the feed point impedance.

In another embodiment the wire mesh array 508 is conductively coupled to surface rock using a conductive epoxy adhesive or some other material that will provide for a distributed conductive path to surface rock.

Each wire mesh 506 is designed to ensure very low resistance across the surface area of the wire mesh 506 with maximum conductive coupling to the ground. The arrangement helps with heat dissipation.

In another embodiment, each wire mesh 506 is combined with heat sinks. The heat sinks are designed to remove heat from the wire meshes 506 in order to reduce ground heating caused by the high power concentrations produced by the EM probe wave transmitter assembly 200.

The transmitter antenna assembly 110 may be one of the following antenna arrangements:

(a) an earth dipole antenna (a dipole terminated into the ground at the ends);
(b) a dipole antenna;
(c) a folded dipole antenna; or
(d) a loop antenna.

For the earth dipole, embodiments may reduce or cancel the airwave and ground wave via an antenna shield 510. The antenna shield 510 terminates into the ground via electrodes 512 at the end of the antenna. The rest of the antenna line 502 is shielded. The antenna shield 510 may either be grounded, or may optionally have an opposite polarity voltage driven on the antenna shield 510 to cancel or reduce the radiated electric field of the antenna. The antenna drives the ground via the electrodes at the end of the earth dipole which directly conducts into the ground.

Figure 3:
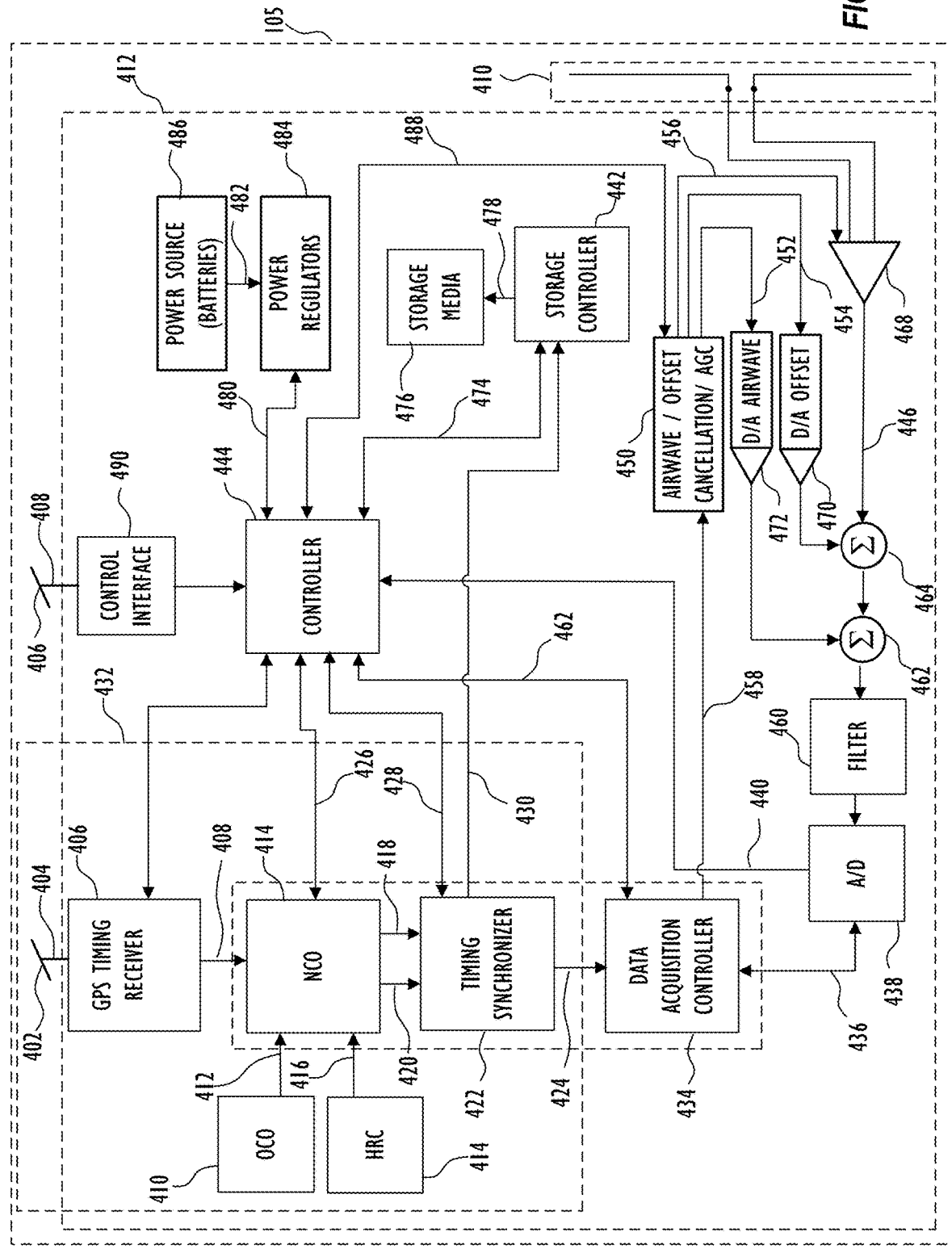
FIG. 3 depicts a schematic that is an overview of the circuit components for a receiver according to one embodiment.

Referring now to FIG. 3, the EM receiver assembly 105 includes the GPS antenna 402, the command and control antenna 406, the receiver antenna 410, and the receiver 412. The system of elements contained within the receiver timing control module 432 has the same function, components and purpose as the system of components contained within the transmitter timing control module 308.

The receiving antenna 410 may be one of the following antenna arrangements:

(a) an earth dipole antenna (Dipole terminated into the ground at the ends);
(b) a dipole Antenna;
(c) a folded dipole antenna;
(d) a loop antenna; or
(e) a referenced multipoint voltage measurement device.

The timing synchronizer 422 outputs a 25.6 Mhz clock that is conductively coupled 424 to the receiver data acquisition controller (RDAC) 434.

The 25.6 Mhz low rate clock 424 in the receiver and the 25.6 Mhz low rate clock 424 in the transmitter are synchronized to within 3 nanoseconds via the method described herein. The low rate clock 424 is used to drive the data acquisition process in the receiver and the low rate clock 424 used to drive the data acquisition process in transmitter. The designed waveform that is transmitted is recorded and the received wave is recorded by receivers in the system in complete synchronization.

The RDAC 434 in conductively coupled 436 to the analog to digital converter (ADC) 438. The RDAC 434 controls the order in which channels of data are collected from the ADC 438. In addition the RDAC 434 is conductively coupled to the airwave removal, offset cancellation and automatic gain control module (AOA) 450. Data from the ADC 438 is conductively couple 440 to the controller 450. The ADC 438 data has direct memory access to the storage controller 442.

The AOA module 450 generates three compensating digital signals. The airwave compensation signal 452, the offset signal 454 and the gain control signal 456. The airwave compensation signal is converted by a digital to analog converter 472, inverted and applied 462, to the incoming signal 446.

The airwave wave compensation signal 452 is created using a priori knowledge of the EM transmitted PRN wave as generated in the transmitter waveform generator 258. This can also be accomplished via a priori knowledge about the autocorrelation of the EM PRN wave and the velocity differences between the geophysical scatter wave, and the airwave and ground-wave. The same a priori knowledge provides knowledge about the EM PRN waveform that allows calculation of a zero-frequency offset voltage at the output of the preamplifier 468. The AOA module 450 receives data from the receiver ADC 438 and timing information from the RDAC 434 and cancels the offset and airwave and ground wave signals using a priori knowledge of the EM PRN waveform.

The offset signal 454 is converted by a digital to analog converter 470, inverted and applied via a very low pass filter 464 to the incoming signal 446. The gain control signal 456 is applied to a digitally controlled resistor chain in the input amplifier module 468. The gain of the input preamplifier module 410 can be adjusted by the digitally controlled resistor providing for automatic gain control.

The receiver antenna assembly 410 is conductively coupled to the receiver preamplifier module 468. The receiver preamplifier module 410 amplifies the signal received by the antenna assembly 410. The receiver preamplifier module 410 contains a low-voltage noise, low-voltage offset voltage, amplifier which boosts up the signal from the antenna assembly 410 in order to increase the signal compared to the ADC 438 noise floor.

The preamplifier module 468 contains a preamplifier that preferably has a relatively flat noise floor from 0 Hertz to 10 Kilohertz. The preamplifier module 410 amplifies signal frequencies from zero to 10 KHz. In one embodiment, the preamplifier has a noise floor significantly lower than $25 \times 10^{-18}$ volts$^2$ per Hertz in the 0.01 Hertz to 10 KHz band.

The input preamplifier module 468 is conductively coupled 446, to the offset compensation circuit 464 and the output of the compensation circuit is conductively coupled to the airwave compensation circuit 462. The signal from the airwave compensation circuit 462 is conductively coupled to the filter circuit 460. The filter circuit 460 is a designed low pass filter that has a known group phase delay. The output of the filter circuit 460 is conductively coupled to the ADC 438. The ADC 438 digitizes the signal.

The combination of the circuits and components within the transmitter assembly 205 and the receiver assemblies 105 allows for system wide synchronization (preferably within 100 ns), high data collection rates (greater than 48 KHz and preferably greater than 1 MHz), and extremely high dynamic range (preferably greater than 130 dB). These factors allow for the successful use of PRN codes and other designed wave forms as described above. Part of the dynamic range is gained from the implementation of precisely timed PRN codes.

Referring again to FIG. 1, the application of these features allows the receiver array 115 to be placed very close, within 15 m, of a powerful transmitting antenna 110 and a high power transmitter assembly 205. In some embodiments, the receiver array and the transmitter assembly may be positioned between 15 m and 1 km of each other. The placement of the receiver array 115 allows for the detection of the extremely weak signals that return to the receivers after traveling straight down from the transmitting antenna 110 to the subsurface layer of interest 150 and back to the receiver array 115 on the surface 100. The measurement of the extremely weak signals allows for the detection of changes in subsurface resistance as the result of deliberate introduction of fluids or gases of different resistance in the subsurface layer of interest 150 through the subsurface tubing or lateral 140, or changes in the position of fluids or gases of different resistance in the subsurface layer of interest 150 caused by other actions such as removal of fluids from the well bore, injection of fluids or gasses into adjacent well bores, or a combination of both. The detection of the amplitude ratio or phase difference signals that change caused by the introduction of fluids and or gases in the subsurface layer of interest 150 allows for the creation of images that are an aggregate of the amplitude ratio data from each receiver in the receiver array separated in time. Similar images can be obtained using phase difference data. These images separated in time then provide a record of the fluid or gas movement over time in the subsurface layer of interest 150. The proximate location of the receivers in the receiver array 115 on the surface 100 indicates the distance in the x and y horizontal axis of the changes in the signals subsurface. There are however, intervening structures that may cause shifting or diffusion of the surface 100 image. In order to correct for these effects a forward model is created based on prior knowledge of the subsurface structures.

Turning now to FIG. 5, an example image data 600 is illustrated in a horizontal plane viewed from above. The combination of the data received from each of the receivers 105 in the receiver array 115 in the horizontal plane, and the forward model allows for the determination of the half frac length 604. The squares 610 throughout the image 600 are the locations of the receivers 105 in the receiver array 115. The forward model is used to place the receiver array 115 on the surface 100 in positions to ensure that the complete subsurface frac occurring at 140 in the subsurface layer of interest 150 can be resolved. In one embodiment the position location, GPS location coordinates in the state plane, of the data set received from the receiver array 115 is corrected and repositioned using the forward model. The process is similar to that of providing a set of correcting lenses in an optical system. The data from each receiver 105 can now be mapped horizontally onto the subsurface layer of interest 150 at the fracing location on the lateral tubing 140. Because the position location on the surface of receivers 105 can be mapped directly onto the subsurface layer of interest 150, the frac half-length 604 can be calculated. In another embodiment, the full frac extent 606 or 602 can be determined. In a further embodiment, problems that have occurred in the frac procedure can be reported as is indicated by a bridging event 608. In a further embodiment, the image indicates a volumetric value as shown by the shaded area generally indicated as 612. A person skilled in the techniques of frac modeling will understand the concepts of the half frac length, full frac extent, bridging events, and volumetric values, and the importance of these values in determining the expected producing volume created by a hydraulic fracturing operation.

Additional data is obtained through cross correlation of the transmitted and received PRN codes and allows the resolution of resistance throughout the vertical column of layers in a static situation. Because of the high accuracy of the clocks in the system, the high sensitivity of the acquisition system, and the high speed transmitter switches, an additional level of processing becomes available. The method allows for the determination of the resistance of successive layers below the surface. The method allows for the successive removal of time bins within the cross correlation data. This also allows for PRN codes of different frequency content to be transmitted. Typically the high frequency content data is used to resolve near surface resistance and velocity profiles. Lower frequency content codes are transmitted to obtain resistance and velocity profiles for intermediate depth layers. And finally PRN codes with frequency content up to 250 Hz are transmitted in order to resolve the resistance and velocity profiles of the deepest layers. In the application of PRN codes in the prior art, the resultant resistance, velocity, and attenuation profiles become chaotic at depths beyond 800 m. The techniques described herein produce results of good accuracy to depths in excess of 4,500 m.

Cross-correlation data received in a dynamic situation, when fluids or gasses of different resistance to the subsurface layer of interest 150 are moving in the subsurface layer of interest 150, provide an additional way to resolve vertical information about the layer of interest 150. The cross-correlation data created has a limited number of time bins that respond and vary as fluid or gasses are injected in to the layer of interest 150 at the lateral 140. Since the data change strongly correlates to the process of hydraulic fracturing, the bins can be collected together to produce a broad band response. The responses change over time with the hydraulic fracturing and show varying amplitude and time duration. The amplitude and time duration contain information about the vertical height of the fractured structure. The number of samples per PRN code bin or chip is very high when collecting data at ADC rates in excess of 48,000 samples per second. The high samples per bin in the present invention increases the data diversity significantly.

The system described above provides several additional capabilities not found in the prior art, including: (a) precise removal of near surface responses; (b) measurement of weak very low angle (near-vertical) reflections that cannot be recorded when transmitters and receivers are placed far from each other; (c) detecting reflections and refractions of the transmitted signal that were previously though impossible to detect; (d) real-time detection of differences caused by the introduction of fracing fluid into a subsurface layer; (e) real-time detection of movement of fluid when flowback is occurring; and real time detection of fluid or gas movement during and EOR operation.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method of collecting subsurface geophysical data, comprising:
   generating a probe signal by a transmitter, the probe signal comprising a continuously repeated predetermined binary waveform;
   receiving a reflection of the probe signal from a subsurface layer of interest by a receiver, the receiver synchronized with the transmitter;
   processing the reflection of the probe signal to generate resistance, velocity, and attenuation profiles associated with the subsurface layer of interest; and
   detecting real-time movement of fracing fluids in the subsurface layer of interest based on the processed reflection of the probe signal,
   wherein the subsurface layer of interest is greater than 800 m below a surface of the earth, and
   wherein the transmitter and receiver are coherently timed to better than 100 nanoseconds in a time domain.

2. The method of claim 1, wherein the predetermined binary waveform is a pseudo random noise code of a length at least 8191 chips.

3. The method of claim 1, wherein generating resistance, velocity, and attenuation profiles comprises:
   cross-correlating received binary waveforms with the predetermined binary waveform, producing a cross-correlation data.

4. The method of claim 3, further comprising:
   allocating the cross-correlation data into time bins;
   removing time bins within the cross-correlation data; and
   calculating resistance and velocity profiles for multiple subsurface layers, responsive to the removal of time bins.

5. The method of claim 3, wherein detecting injection of fluids injected into the layer of interest by detecting changes in the cross-correlation data over time.

6. The method of claim 1, wherein the probe signal comprises a sequence of predetermined binary waveforms, wherein successive elements of the sequence of predetermined binary waveforms are selected based on a sequence of different subsurface layer depths of interest.

7. The method of claim 1, further comprising:
   positioning the transmitter and receiver between 15 m and 1 km of each other; and
   detecting changes in subsurface resistance resulting from an introduction of fluid into the subsurface layer of interest.

* * * * *